Patented July 22, 1952

2,604,489

UNITED STATES PATENT OFFICE 2,604,489

ETHER ESTERS OF GLYCEROL

Donald S. Melstrom, Oakland, and Seaver A. Ballard, Orinda, Calif., assignors to Shell Development Company, San Francisco, Calif., a corporation of Delaware No Drawing. Application January 3, 1949, Serial No. 69,034

4 Claims. (Cl. 260—488)

This invention relates to new chemical compounds, and more particularly to a new and useful class of ether esters of glycerol.

Specifically, the invention provides carboxylic acid esters of dimethylphenyl allyl-type ethers of glycerol, i. e., glycerol derivatives wherein the hydrogen atom of one of the hydroxyl groups of the glycerol molecule has been replaced by an acyl radical derived from a carboxylic acid, the hydrogen atom of one of the other hydroxyl groups of the glycerol molecule has been replaced by a dimethylphenyl radical, and the hydrogen atom of the remaining hydroxyl group of the glycerol molecule has been replaced by an allyl-type radical. The novel ether esters of glycerol possess many unexpected beneficial properties which enable the said compounds to be utilized for important industrial applications described below.

This application is a continuation-in-part of our application Serial No. 558,966, filed October 16, 1944, now abandoned.

It is an object of the invention to provide a new class of chemical compounds. It is a further object of the invention to provide novel chemical compounds possessing many unexpected properties which make them particularly useful and valuable. It is a further object of the invention to provide a new and particularly useful class of ether esters of glycerol. It is a further object to provide ether esters of glycerol which may be used for many important industrial applications. It is a further object to provide a simple and economical method for the production of the above-described novel ether esters of glycerol. Other objects and advantages of the invention will be apparent from the following detailed description thereof.

These and other objects of the invention are accomplished by the above-described carboxylic acid esters of dimethylphenyl allyl-type ethers of glycerol which are obtained by esterifying one of the hydroxyl groups of a glycerol molecule with a carboxylic acid, etherifying one of the other hydroxyl groups with a dimethylphenol, and etherifying the remaining hydroxyl group with an allyl-type alcohol. The unique structural arrangement of these novel ether esters of glycerol endows the said compounds with many unexpected beneficial properties which make them particularly valuable and useful in industry. The novel ether esters of glycerol have been found to be especially valuble as plasticizers for the vinyl-type resins, such as polyvinyl chloride. The novel compounds of the invention are also valuable as plasticizers for the cellulose resins, such as nitrocellulose and cellulose acetate. The novel ether esters are able to undergo addition polymerization at the olefinic double bond present in the allyl-type ether radical and may be polymerized with themselves or with other ethenoid monomers to produce valuable polymeric material. They are also of value as solvents, diluents, modifying agents and as processing agents in the textile industry. The novel ether esters of glycerols are also useful as additives for insecticidal, fungicidal and parasiticidal compositions.

The novel compounds of the invention may be described as glycerol derivatives wherein the hydrogen atom of one of the hydroxyl groups of a glycerol molecule has been replaced by an acyl radical derived from a carboxylic acid, the hydrogen atom of one of the other hydroxyl groups of the glycerol molecule has been replaced by a dimethylphenyl radical, and the hydrogen atom of the remaining hydroxyl group of the glycerol molecule has been replaced by an allyl-type radical. The acyl radical derived from the carboxylic acids may be attached to the oxygen atom of the hydroxyl group in the alpha, beta or gamma positions of the glycerol molecule, but is preferably attached to the oxygen atom of the hydroxyl group in the beta position. The dimethylphenyl radical and allyl-type radical may be attached to the oxygen atoms of the hydroxyl groups in the alpha, beta or gamma positions, but are preferably attached to the oxygen atoms of the terminal hydroxyl groups.

The acyl radicals which are to be attached to one of the oxygen atoms of the glycerol molecule are those radicals derived from the carboxylic acids by subtracting a hydroxyl group from one of the carboxyl groups of the said acids. The acids that may be employed for this purpose may be saturated, unsaturated cyclic, acyclic or aromatic and may be monobasic or polybasic. If the acids are polybasic they may be esterified or reacted in any or all but one of the carboxylic acid groups with an alcohol or basic reacting substance. Examples of such acids are acetic, propionic, formic, butyric, benzoic, phthalic, acrylic, isobutyric, trimethyladipic, oxalic, itaconic, maleic, fumaric, adipic, citric, oleic, stearic, bromostearic, sulfoacetic, monoallyl ester of phthalic acid, monoethyl ester of oxalic acid, diallyl ester of citric acid, monomethallyl ester of itaconic acid, monoallyl ester of trimethyladipic acid, monocrotyl ester of itaconic acid, monoethallyl ester of oxalic acid, monosodium salt of phthalic acid, monosodium salt of adipic acid, and the like. The acyl radicals which may be derived from these acids are exemplified by acetyl, propionyl, formyl, butyryl, benzoyl, acrylyl, isobutyryl, oxalyl, phthalyl, and the like.

The preferred group of acyl radicals are those derived from the monocarboxylic acids such as acetyl, propionyl, butyryl, octanoyl, acrylyl, and the like.

The dimethylphenyl radicals which are to be attached to one of the oxygen atoms of the glycerol molecule are those radicals derived from the dimethylphenols by subtracting a hydroxyl group from the said alcohols. The alcohols that may be employed for this purpose are exemplified by 3,5-dimethylphenol, 2,5-dimethylphenol, 2,3-dimethylphenol, 2,4-dimethylphenol, 3,4-dimethylphenol, and 2,6-dimethylphenol. The dimethylphenyl radicals which may be derived from these alcohols are exemplified by 3,5-dimethylphenyl, 2,5-dimethylphenyl, 2,3-dimethylphenyl, 2,4-dimethylphenyl, and 2,6-dimethylphenyl. It has been found that the ether esters of glycerol containing the 3,5-dimethylphenyl radical possess exceptionally fine properties and this is the more preferred dimethylphenyl radical to be attached to the oxygen atom of the glycerol molecule.

The allyl-type radicals which are to be attached to one of the oxygen atoms of the glycerol molecule are those radicals derived from the allyl-type alcohols by subtracting a hydroxyl group from the said alcohols. The allyl-type alcohols are defined as those alcohols having their hydroxyl group attached to an aliphatic carbon atom which is joined through a single bond to another aliphatic carbon atom which in turn is joined through an olefinic double bond to a third aliphatic carbon atom. They are sometimes referred to as beta,gamma-olefinic unsaturated alcohols. The allyl-type alcohols may be represented by the formula

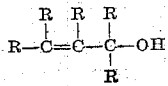

wherein R is a member of the group consisting of the hydrogen atom and the hydrocarbon radicals. It is to be understood that any of the R's may be linked together to form a cyclic radical, such as the furfuryl radical. Examples of the allyl-type alcohols are allyl alcohol, methallyl alcohol, ethallyl alcohol, 2-buten-1-ol, 2-hexen-1-ol, 3-methyl-2-buten-1-ol, 3-cyclohexyl-2-buten-1-ol, 2-isobutyl-2-buten-1-ol, 2-phenyl-2-propen-1-ol, 3-cyclopentyl-2-hexen-1-ol, and the like. Allyl-type radicals which may be derived from these alcohols are exemplified by allyl, methallyl, ethallyl, 2-butenyl, 2-hexenyl, 3-methyl-2-butenyl, 3-cyclohexyl-2-butenyl, and the like. Preferred allyl-type radicals to be attached to the oxygen atom of the glycerol molecule are those wherein R is a member of the group consisting of the hydrogen atom and the alkyl radicals, such as methyl, ethyl, butyl, hexyl, octyl, isooctyl, decyl, and the like. This preferred group of radicals may be more clearly described as beta,gamma-alkenyl radicals.

Hydrocarbon-substituted glycerols may be used in place of the unsubstituted glycerol molecule in producing the novel ether esters. Hydrocarbon-substituted glycerols are glycerol molecules having at least one of the hydrocarbon atoms attached to the carbon atoms of the said molecule replaced by a hydrocarbon radical. The substituted hydrocarbon radicals may be saturated, unsaturated, cyclic or acyclic, and may be exemplified by methyl, ethyl, butyl, phenyl, cyclohexyl, cyclopentyl, allyl, methallyl, and the like. Examples of the hydrocarbon-substituted glycerols are the alkyl-substituted glycerols, such as alpha-methyl glycerol, beta-ethyl glycerol, alpha,gamma-dimethyl glycerol, alpha-methyl glycerol, beta-propyl glycerol, alpha-isobutyl glycerol, beta-hexyl glycerol; the aryl glycerols such as alpha-phenyl glycerol; the cycloalkyl glycerols such as alpha-cyclohexyl glycerol and beta-cyclopentyl glycerol, etc.

Examples of the novel ether esters of glycerol are:

Glycerol alpha-(2,5-dimethylphenyl) gamma-allyl ether monoacetate,
Alpha-methyl glycerol alpha(2,6-dimethylphenyl) gamma-methallyl ether monopropionate,
Glycerol alpha-(3,4-dimethylphenyl) gamma-ethallyl ether monobutyrate,
Bis[glycerol alpha-methallyl gamma-(2,5-dimethylphenyl) ether]phthalate,
Alpha-ethyl glycerol alpha-2-butenyl gamma-(2,4-dimethylphenyl) ether monobenzoate,
Glycerol beta-(2,5-dimethylphenyl) gamma-2-hexenyl ether monoacrylate,
Glycerol alpha-(2,5-dimethylphenyl) beta-2-ethyl-2-hexenyl ether monopropionate.

Examples of the preferred ether esters of glycerol, i. e. those wherein the dimethylphenyl radical is a 3,5-dimethylphenyl radical and is attached to the oxygen atom of the hydroxyl group in the alpha position, and the allyl-type radical is an alpha,beta-alkenyl radical and is attached to the oxygen atom of the hydroxyl group in the gamma position are:

Glycerol alpha-(3,5-dimethylphenyl) gamma-allyl ether monoacetate,
Glycerol alpha-(3,5-dimethylphenyl) gamma-methallyl ether monobutyrate,
Glycerol alpha-(3,5-dimethylphenyl) gamma-ethallyl ether monocaproate,
Bis[glycerol alpha-(3,5-dimethylphenyl) gamma-2-butenyl ether]succinate,
Bis[glycerol alpha-(3,5-dimethylphenyl) gamma-2-isopropyl-2-hexenyl ether]phthalate,
Glycerol alpha-(3,5-dimethylphenyl) gamma-2-heptenyl ether monoacrylate,
Bis[glycerol alpha-(3,5-dimethylphenyl) gamma-2-pentenyl ether]adipate.

The above-described ether esters of glycerol may be prepared by any suitable method. They are preferably obtained by first producing the dimethylphenyl allyl-type ether of glycerol and esterifying this product with the desired carboxylic acid or carboxylic acid anhydride.

The dimethylphenyl allyl-type ether of glycerol employed in this process may be prepared by a variety of methods. The diether may be prepared, for example, by reacting glycerol trihalohydrin with sodium hydroxide and dimethylphenol and an allyl-type alcohol in amounts sufficient to react with only two of the halogen atoms so as to form dimethylphenyl allyl-type ether of glycerol monohalohydrin and then removing the remaining halogen atom by conventional methods. The diether may also be prepared by first producing the dimethylphenyl ether of glycerol monohalohydrin by reacting epihalohydrin with the desired amount of dimethylphenol and then reacting the resulting product with an allyl-type alcohol in the presence of a suitable catalyst.

The diether may also be prepared by first producing the allyl-type ether of glycerol monohalohydrin by reacting epihalohydrin with the desired amount of allyl-type alcohol and then reacting the resulting product with the appropriate amount of dimethylphenol in the presence of a suitable catalyst. The preferred method for producing the dimethylphenyl allyl-type ether of glycerol comprises first producing the allyl-type ether of glycerol monochlorohydrin by reacting epihalohydrin with an allyl-type alcohol, in the presence of a catalyst, such as hydrofluoric acid, and then reacting the resulting product with dimethylphenol in the presence of sodium hydroxide.

The allyl-type monoether of glycerol monohalohydrin may be prepared by merely heating the epihalohydrin and the allyl-type alcohol together at the normal boiling temperature of the reaction mixture. Since the reaction occurs in the liquid phase, the materials vaporized from the boiling mixture may be returned thereto by some suitable condensing means, such as a reflux condenser. The allyl-type alcohol is ordinarily employed in a molecular excess over the epihalohydrin. Excellent results are obtained when the molecular ratio of allyl-type alcohol to epihalohydrin is about 2–5 to 1. The preferred catalysts to be employed for this reaction are the fluorine-containing catalysts, such as hydrofluoric acid. The amount of the catalyst employed will usually vary from about .01% to 5% by weight of the reactants. If desired various diluents may be utilized in this type of reaction. Suitable diluents are the aromatic and non-aromatic inert compounds, such as benzene, hexane, etc. Upon completion of the reaction the catalyst and whatever other acidity may have developed may be neutralized by treatment with basic-acting substances and the product separated by any desired method, such as fractional distillation.

The allyl-type monoether of glycerine monohalohydrin produced by this process is then preferably reacted with the dimethylphenol in the presence of sodium hydroxide to produce the dimethylphenyl allyl-type diether of glycerol. The temperature employed in this process will vary over a considerable range, e. g. from 50° C. to 150° C., but the reaction is preferably maintained at the normal boiling temperature of the reaction mixture. The dimethylphenol is preferably maintained in molecular excess over the allyl-type monoether but satisfactory results are obtained when the monoether is maintained in excess. Solvents that may be employed for this process are preferably those in which the sodium halide salts are not appreciably soluble and in which water is appreciably soluble, such as isopropyl alcohol, normal propyl alcohol, secondary butyl alcohol, and the like. Upon completion of the reaction the desired product may be recovered by any conventional separation method, such as distillation, and the like.

The esterification of the dimethylphenyl allyl-type ethers of glycerol with the desired carboxylic acid may be accomplished by any of the conventional methods, such as reacting the diether of glycerol with the carboxylic acid, carboxylic acid anhydride or carboxylic acid halide under suitable conditions in the presence of a catalyst.

The more preferred method comprises reacting the dimethylphenyl allyl-type ether of glycerol with the carboxylic acid in the presence of an esterification catalyst. The catalyst employed for this process may be any of the known esterification catalysts, such as p-toluenesulfonic acid, ethylsulfonic acid, hydrobromic acid, chloroacetic acid, sulfuric acid, benzenesulfonic acid, formic acid, boron and silicon fluorides, acid salts, such as monosodium and monopotassium sulfates and salts of strong acids and weak bases, such as aluminum sulfate, zinc chloride, zinc sulfate, and the like. The amount of the catalyst employed will vary over a wide range depending upon the particular reactants, the type of catalyst employed, and the reaction conditions. In general, the amount of catalyst will vary between 0.1% and 5% by weight of reactants. Preferred amounts of catalyst vary between 0.1% to 2% by weight.

The quantities of the acid and the dimethylphenyl allyl-type ether of glycerol to be reacted together may vary over a considerable range. As there is one free hydroxyl group on the diether molecule to be esterified by the acid the said diether should be reacted with at least an equimolar amount, and preferably an excess, of the desired carboxylic acid. In most cases, the acid and diether will be added to the reaction mixture so that there will be from 1 to 4 moles of acid for every mole of diether.

The esterification may be accomplished in the presence or absence of solvents or diluents. In case solvents or diluents are desired, inert organic compounds, such as benzene, toluene, cyclohexanone, and xylene, which do not interfere with the reaction may be employed.

The temperatures employed during the esterification reaction may vary depending upon the type of reactants and catalyst to be employed. In most cases the temperature will vary from about 35° C. to 200° C., with a preferred range being between 65° C. and 150° C. Higher or lower temperatures may be employed, however, if desired or necessary. Atmospheric, superatmospheric or subatmospheric pressures may be employed.

The water formed during the esterification may be removed during or at the completion of the process. The removal of the water may be accomplished by methods well known in the art, such as distillation, and the like. It is usually preferred to utilize a compound such as benzene in the reaction mixture and remove the water of esterification during the process by azeotropic distillation.

The novel ether esters of glycerol produced by the above-described process may be recovered from the reaction mixture by any suitable means, such as extraction, fractional distillation, fractional precipitation, and the like.

The glycerol ether esters of the invention are substantially colorless, mobile liquids having relatively high boiling points. They are ideally suited for use as solvents, diluents, modifying agents, and the like. As stated hereinabove, the novel glycerol ether esters of the invention are particularly suited for use as plasticizers for vinyl-type resins.

The vinyl-type polymers which may be plasticized by the novel esters of the invention are the homopolymers, copolymers and interpolymers of the vinyl-type monomers. The vinyl-type monomers include all those organic compounds containing at least one $CH_2=C<$ group in their molecule. Examples of the vinyl-type monomers are styrene, alpha-methylstyrene, dichlorostyrene, vinyl naphthalene, vinyl phenol, acrylic acid and the alpha-alkyl substituted acrylic acids; the esters of these unsaturated acids, such as methyl acrylate, methyl methacrylate, butyl methacrylate, and propyl acrylate; the vinylidene halides, such as vinylidene chloride and vinylidene bromide, the vinyl esters of the inorganic acids, such as the halogen acids, and hydrocyanic acid, as vinyl chloride, vinyl bromide, acrylonitrile, and methacrylonitrile; the vinyl esters of the monocarboxylic acids, such as vinyl acetate, vinyl chloroacetate, vinyl benzoate, vinyl valerate, and vinyl caproate; the vinyl esters of the polycarboxylic acids, such as divinyl succinate, divinyl adipate, vinyl allyl phthalate, vinyl methallyl pimelate, and vinyl methyl glutarate, the vinyl esters of the unsaturated acids, such as vinyl acrylate, vinyl crotonate, and vinyl methacrylate; the vinyl ethers, such as vinyl ethyl ether, vinyl butyl ether, and vinyl allyl ether, and the vinyl ketones, such as vinyl butyl ketone and vinyl ethyl ketone.

A single one of the ether esters of glycerol may be used as the plasticizer or a combination of them may be used. In addition, the said ether esters may be mixed with other known plasticizers, such as dioctyl phthalate, etc., and the resulting mixture used as a plasticizer for the vinyl resins.

The amount of the ether esters to be incorporated with the above-described vinyl polymers may vary over a considerable range depending upon the particular type of polymer to be utilized, the intended use of the compounded resins, etc. In most cases the amount of the plasticizer will vary from about 20 to 150 parts by weight for every 100 parts by weight of resin. A more preferred range of plasticizer to be utilized comprises 40 to 75 parts by weight of plasticizer for every 100 parts by weight of resin.

The vinyl-type resin composition may be compounded by means of conventional equipment, such as mills of the heated roller type or internal mixers. The plasticizer and other compounding ingredients, such as fillers and stabilizers, are worked into the vinyl resins so that they are thoroughly dispersed therein by means of such equipment, and the resulting composition then molded, calendered, extruded or otherwise formed into articles of the desired shape by conventional procedure.

As stated above, the novel ether esters of glycerol are also suitable for use in the production of polymeric material such as might be used in the preparation of surface coating compositions, impregnating and laminating compositions, and the like. The polymeric material is preferably prepared by heating the said ether esters of glycerol with themselves or with vinyl-type monomers such as those described hereinabove in the presence of a polymerization catalyst. The polymerization may be accomplished in bulk, in the presence of solvents or diluents, or in an aqueous emulsion or suspension. Examples of solvents that may be utilized for the polymerization include hexane, cyclohexanone, benzene, butane, methyl ethyl ketone, dibutyl ether, and the like, and mixtures thereof.

The catalysts that may be employed in the polymerization may be any of the known polymerization catalysts, such as persulfuric acid, peracetic acid, perphthalic acid, potassium persulfate, ammonium persulfate, potassium percarbonate, potassium perphosphate, sodium perborate, diacyl peroxides, such as dibenzoyl peroxide, dicaprylyl peroxide, dilauroyl peroxide, benzoyl acetyl peroxide, the alkyl peroxides, such as diethyl peroxide, tertiary butyl hydroperoxide, and dipropyl peroxide, hydrogen peroxide and zinc peroxide. Mixtures of catalysts may also be employed.

The amount of the catalyst employed will vary over a considerable range depending upon the particular reactants and conditions employed. In most cases the amount of catalyst will vary between 0.01% and 3% by weight of the material being polymerized. A preferred amount of catalyst will vary between .01% and 1% by weight.

The temperature employed in the polymerization will vary over a considerable range depending upon the type of catalyst employed, desired rate of polymerization, etc. In most cases the temperature will range between 40° C. and 100° C., with a preferred range varying between 45° C. and 75° C. Atmospheric, reduced or superatmospheric pressures may be employed in the polymerization. If desired, the polymerization may be conducted in the absence of oxygen, i. e., under a blanket of an inert gas as carbon dioxide, methane, nitrogen, and the like.

The homopolymers of the novel ether esters of glycerol will vary from viscous liquids to semi-solids and may be utilized for a great variety of applications. As stated above, they are particularly suited for use in the preparation of surface coating compositions, such as paints, enamels, varnishes, and the like. They may also be utilized as ingredients for laminating solutions in the preparation of single and multi-layer laminates of wood, cloth, etc. The copolymers of the ether esters of glycerol with the vinyl-type monomers will, in many cases, be hard-surfaced resins which may be cut, machined, and drilled to form the desired shaped articles.

To illustrate the manner in which the invention may be carried out the following examples are given. It is to be understood, however, that the examples are for the purpose of illustration and the invention is not to be regarded as limited to any of the specific conditions recited therein. Parts disclosed in the examples are parts by weight.

*Example I*

A mixture of about 122 parts of 3,5-dimethylphenol and about 40 parts of sodium hydroxide pellets in about 155 parts by weight of dioxane was heated to about 95° C. to about 100° C. and stirred for about one hour. Approximately 151 parts by weight of glycerol alpha-monochlorohydrin gamma-allyl ether was added slowly and the reaction continued for about one to two hours at 95° C. to 100° C. The mixture was distilled at 128° C. to 131° C. to produce a high yield of glycerol alpha - (3,5 - dimethylphenyl) gamma-allyl ether which has the following physical properties: $d_4^{20}$ 1.0391 and $n_D^{20}$ 1.519.

About 35 parts of glycerol alpha-(3,5-dimethylphenyl) gammaallyl ether produced above were mixed with 36 parts of glacial acetic acid, 0.2 parts of p-toluenesulfonic acid, and about 50 parts of benzene. The mixture was heated at 110° C.–130° C. for 3 hours and the water formed during the process was removed by azeotropic distillation with the benzene. The mixture was then distilled to produce a 90% yield of glycerol alpha-(3,5-dimethylphenyl) gamma-allyl ether monoacetate. The said diether ester of glycerol was a substantially colorless, mobile liquid having a boiling point of 133° C. to 135° C at 1 mm. pressure and physical properties $d_4^{20}$ 1.0489 and $n_D^{20}$ 1.4998. Analysis of the product showed a carbon content of 68.93% compared to a theoretical value of 69.04%; a hydrogen content of 7.96% compared to a theoretical value of 7.97%, and an ester value of 0.362 equivalents per 100 grams compared to a theoretical value of 0.359 per 100 grams.

*Example II*

About 50 parts of glycerol alpha-(3,5-dimethylphenyl) gamma-allyl ether produced in Example I are mixed with 50 parts of propionic acid, 1 part of p-toluenesulfonic acid, and 75 parts of benzene. The resulting mixture is heated to reflux temperature and the water formed during the reaction removed by azeotropic distillation with the benzene. The mixture is distilled to produce a 90% yield of glycerol alpha-(3,5-dimethylphenyl) gamma-allyl ether monopropionate. The said diether ester of glycerol is a substantially colorless, mobile liquid having a boiling point between 138° C. and 140° C. under a pressure of 1 mm.

*Example III*

About 75 parts of glycerol alpha-(3,5-dimethylphenyl) gamma-allyl ether produced in Example I are mixed with 30 parts of phthalic acid anhydride, 0.2 part of p-toluenesulfonic acid, and about 70 parts of toluene. The resulting mixture is heated to reflux temperature and the water formed during the reaction removed by azeotropic distillation. On distillation a colorless, mobile liquid is obtained which is identified as bis(glycerol alpha-(3,5-dimethylphenyl) gamma-allyl ether) phthalate.

*Example IV*

Following the procedure described in Example I, about 165 parts of glycerol alpha-monochlorohydrin gamma-crotyl ether is added to the reaction mixture of about 122 parts of 3,5-dimethylphenol with about 40 parts of sodium hydroxide pellets in about 155 parts by weight of dioxane, to produce glycerol alpha-(3,5-dimethylphenyl) gamma-crotyl ether.

About 80 parts of the glycerol alpha-(3,5-dimethylphenyl) gamma-crotyl ether produced above are mixed with 40 parts of butyric acid, 1 part of p-toluenesulfonic acid and about 75 parts of benzene. The mixture is heated to reflux temperature and the water formed during the reaction removed by azeotropic distillation. The mixture is distilled to produce a high yield of glycerol alpha-(3,5-dimethylphenyl) gamma-crotyl ether monobutyrate, which is a colorless mobile liquid.

*Example V*

Following the procedure described in Example I, about 165 parts of glycerol alpha-monochlorohydrin gamma-methallyl ether is added to the reaction mixture of about 122 parts of 3,5-dimethylphenol with about 40 parts of sodium hydroxide pellets in about 155 parts of dioxane, to produce glycerol alpha-(3,5-dimethylphenyl) gamma-methallyl ether.

About 100 parts of the glycerol alpha-(3,5-dimethylphenyl) gamma-methallyl ether produced above are mixed with 55 parts of propionic acid, 1 part of p-toluenesulfonic acid and 100 parts of toluene. The resulting mixture is heated to reflux temperature and the water formed during the reaction mixture is removed by azeotropic distillation. On distillation a colorless, mobile liquid is obtained which is identified as glycerol alpha-(3,5-dimethylphenyl) gamma-methallyl ether monopropionate.

*Example VI*

About 100 parts of polyvinyl chloride were compounded with about 60 parts of glycerol alpha-(3,5-dimethylphenyl) gamma-allyl ether monoacetate produced in Example I. The diether ester of glycerol was compatible with the said polyvinyl chloride and the resulting plasticized composition had good flexibility, color and improved resistance to water.

*Example VII*

About 100 parts of polyvinyl chloride is compounded with about 65 parts of bis(glycerol alpha-(3,5-dimethylphenyl) gamma-allyl ether) phthalate produced in Example III. The resulting plasticized composition has good flexibility and color.

*Example VIII*

Glycerol alpha-(3,5-dimethylphenyl) gamma-allyl ether monoacetate produced in Example I is heated with about 2% benzoyl peroxide at 65° C. for several hours. The resulting polymer is a viscous liquid suitable for use in the preparation of surface coating compositions.

We claim as our invention:

1. Glycerol alpha-(3,5-dimethylphenyl) gamma-allyl ether monoacetate.
2. Glycerol alpha-(3,5-dimethylphenyl) gamma-2-alkenyl ether monoacetate.
3. Glycerol alpha-(3,5-dimethylphenyl) gamma-allyl ether ester of an organic monocarboxylic acid.
4. A beta,gamma-alkenyl ether of a glycerol (3,5-dimethylphenyl) ether ester of an organic carboxylic acid.

DONALD S. MELSTROM.
SEAVER A. BALLARD.

REFERENCES CITED

The following references are of record in the file of this patent:

UNITED STATES PATENTS

| Number | Name | Date |
|---|---|---|
| 2,343,053 | Grun | Feb. 29, 1944 |